Aug. 30, 1927. Re. 16,727

C. D. PETTIS

CASTING MOLD

Original Filed March 2, 1923 2 Sheets-Sheet 1

INVENTOR
Clifton H. Pettis,
by
Byrne, Stevens & Parmelee
his Attys.

Aug. 30, 1927. Re. 16,727

C. D. PETTIS

CASTING MOLD

Original Filed March 2, 1923 2 Sheets-Sheet 2

INVENTOR

Clifton H. Pettis, by Byrne, Sabin & Parmelee, his attys.

Reissued Aug. 30, 1927. Re. 16,727

UNITED STATES PATENT OFFICE.

CLIFTON D. PETTIS, OF NEW YORK, N. Y.

CASTING MOLD.

Original No. 1,455,353, dated May 15, 1923, Serial No. 622,262, filed March 2, 1923. Application for reissue filed May 14, 1925. Serial No. 30,375.

The present invention has for its object to provide an effective construction of casting mold whereby brake shoes or other articles ordinarily made of cast metal can be formed. The invention consists in the features of novelty hereinafter described, illustrated in the accompanying drawings and particularly pointed out in the claims at the end of this specification. As will hereinafter more fully appear, the invention relates more particularly to that class of casting molds designed to be repeatedly used in the casting operation and commonly designated as "permanent molds".

Figure 1:
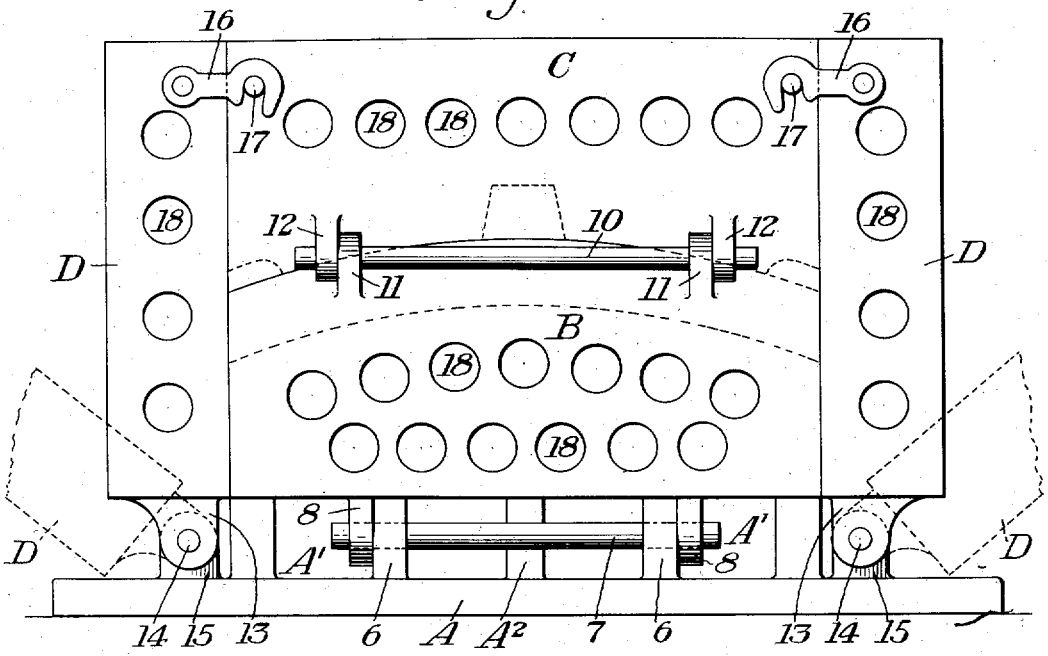
Figure 1 is a view in side elevation of a casting mold embodying my invention.
Figure 2:
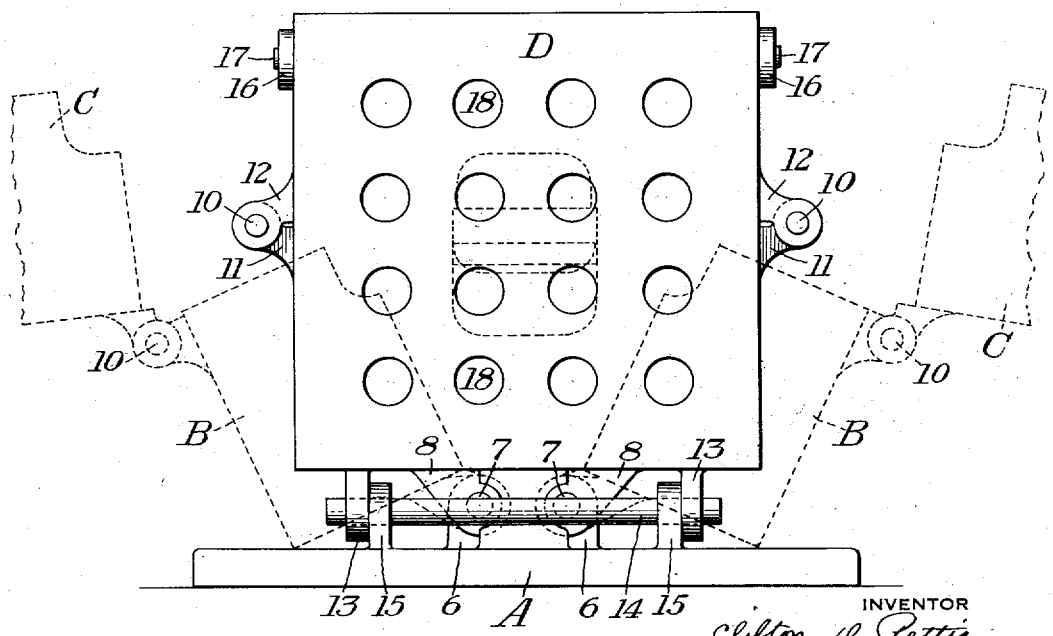
Figure 2 is a view in end elevation.

A designates the base, preferably formed of cast metal, whereon my improved casting mold will be mounted. In the embodiment of the invention illustrated in the drawings, my improved casting mold is shown as comprising a plurality of separable sections or members pivotally mounted upon the base A and forming a flask or holder, each member carrying a corresponding part of the molding receptacle. To this end, the base A is formed with upstanding lugs 6 at each side of its center, through which lugs passes a pivot rod 7, this rod passing also through lugs or ears 8 depending from the bottom of the lower side members B. These lower side members B are pivotally mounted upon opposite sides of a centrally arranged stationary bar or support $A^2$ that rises from and is preferably cast integral with the base A. Each of the lower members B has pivotally connected thereto an upper side member C, the pivoting of these upper and lower side members being conveniently effected by a pivot rod 10 that passes through the lugs 11 of the lower side member and the lugs 12 of the upper side member, as clearly shown in Figures 1 and 2 of the drawings.

From the base of the members D which form the ends of my improved mold, depend lugs 13 through which pass the pivot rods 14, the ends of these rods passing also through the upstanding lugs 15 that rise from the base A and may be cast integral therewith. This arrangement enables the end members D to swing about the pivot rods 14 when the mold is to be opened or closed. When the members are in closed position, as shown in full lines on the drawings, they may be retained in such position by suitable hooks 16, the free ends of which engage the pins 17 projecting outwardly from the upper side members C adjacent their ends.

In the preferred form of my invention, each of the members B, C and D is formed as a hollow casting, the outer walls of these members being perforated as at 18 to allow free circulation of air around the exterior of the molding receptacle, to be presently described.

Figure 3:
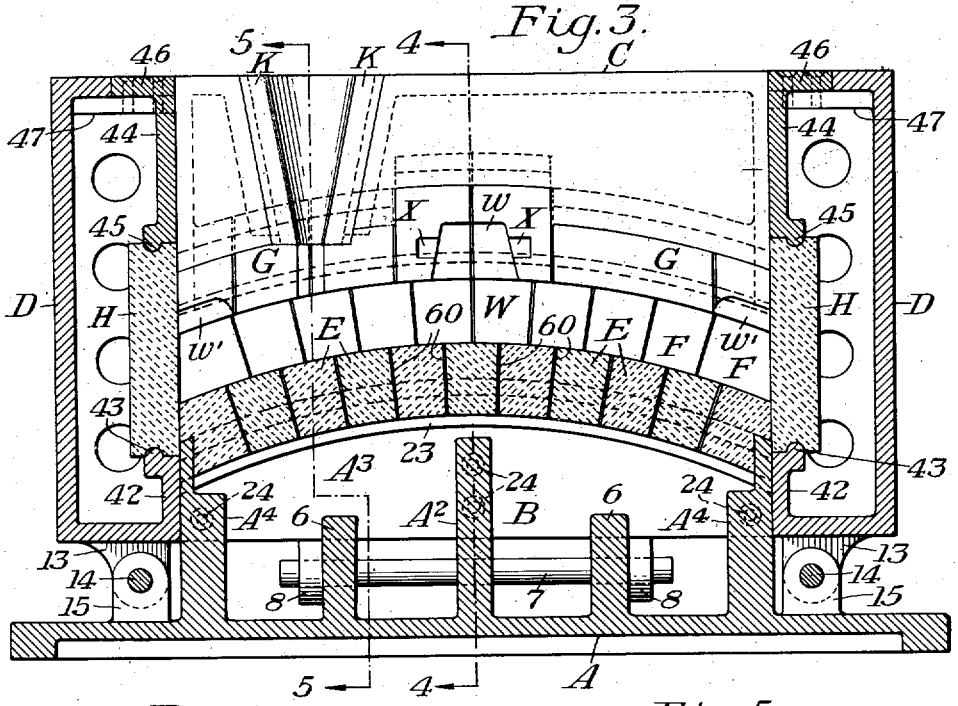
Figure 3 is a view in vertical longitudinal section.
Figure 4:
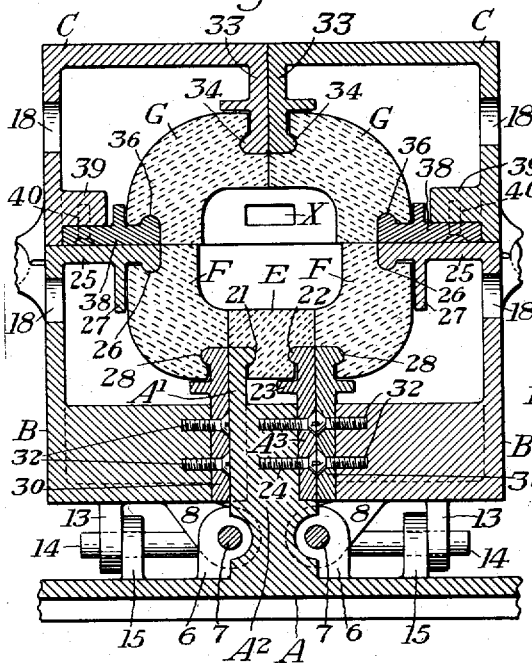
Figure 4 is a view in vertical cross section on line IV—IV of Figure 3.

The molding receptacle is preferably formed of carborundum or some like refractory material that may be molded in the form of blocks and that will offer great resistance to the intense heat of the metal to be cast. In the preferred embodiment of the invention, the walls of the molding receptacle are formed in sections, each composed of a plurality of these blocks of refractory material that are of such construction that they can be readily assembled in the several members of the flask or holder. Thus, the bottom section of the molding receptacle is shown as comprising a series of blocks E mounted upon a longitudinally extending plate or support $A^1$ that may be formed integrally at its center with the upright lug or support $A^2$ and may have its ends integral with the upright lugs $A^4$ that rise from the base A (see Figures 3, 4 and 5). A key or guard plate $A^3$ is formed with a rib 22 that enters a corresponding groove in the side walls of the blocks E, this key being preferably formed also with a longitudinal rib 23 below the rib 22. The opposite walls of the blocks E (see Figure 4) are formed with similar grooves to receive the rib 21 formed on the supporting plate $A^1$. After the blocks E have been placed upon the support $A^1$, the key $A^3$ will be placed in the position shown in Figures 4 and 5 of the drawings, so as to interlock with the blocks E, and the key $A^3$ will then be securely held in place by the screws 24, as shown in Figure 4 of the drawings, the position of these screws being indicated also by dotted lines in Figure 3 of the drawings.

Each of the lower side members B is formed at its top as shown with an inwardly projecting bar or support 25 having at its inner end a longitudinal rib 26 and having also a depending rib 27. The support 25 engages the blocks F constituting a part of the molding receptacle. These blocks F are formed in their upper portions with grooves to receive the ribs 26 and their lower portions are correspondingly shaped to engage the ribs 28 on the key or guard plates 30. In assembling the blocks F, their upper portions are first placed in engagement with the ribs 26 of the supports 25, after which the key or guard plates 30 will have their ribs 28 placed in engagement with the corresponding grooves in the blocks F and will then be secured to the lower side members B by screws 32, as indicated in Figure 4 of the drawings.

As shown, each of the upper side members is provided with an inwardly projecting support 33 having a longitudinal rib 34 for engagement with the blocks G of refractory material that constitute the upper portion of the molding receptacle. The blocks G have their upper edges shaped to engage the ribs 34 of the supports 33 and have their lower edges correspondingly shaped to engage with the ribs 36 on the key or guard plates 38. When the blocks G have been assembled as shown, with their upper ends interlocking with the supports 33, the key or guard plates 38 will be engaged with the lower edges of the blocks G and will then be secured to the inwardly projecting lugs 39 of the members C by screws indicated by dotted lines 40 (see Figure 4). When the blocks of refractory material constituting the bottom and side walls of the molding receptacle are assembled, as shown in the drawings, these blocks completely protect the metal parts of the flask from contact with the molten metal delivered to the casting chamber.

Each of the end members D is formed preferably of a hollow casting with perforations in its outer walls to freely admit air and each of these members D is provided adjacent its bottom with an upstanding support 42 to receive the blocks H of refractory material, the supports 42 each having a longitudinal rib 43 to engage a corresponding groove formed in the lower edges of the blocks H. At its top, each of the members D is provided with a key or guard plate 44 having at its lower edge a rib 45 to engage a corresponding groove formed in each of the blocks H of refractory material. When these blocks H have been set in position upon the supports 42, as shown in Figure 3 of the drawings, the key plates 44 will be arranged as shown, so that their ribs 45 will engage the upper edges of the blocks H. The key plates 44 may be formed with outwardly extending lugs or flanges 46, through which screws (indicated by dotted lines) may be passed to connect the keys or guard plates 44 to lugs 47 projecting inwardly from the wall of the members D.

Figure 5:
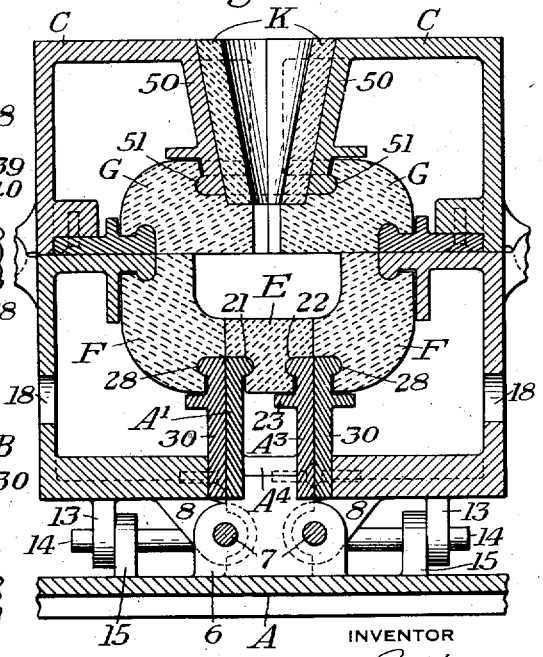
Figure 5 is a view in vertical cross section on line V—V of Figure 3.

By reference to Figures 3 and 5 of the drawings, it will be seen that each of the members C is formed with an inclined curved depending web or part 50 adapted to receive a corresponding half-conical block K of refractory material, these blocks K forming the pouring gate of the mold and meeting upon the parting line of the members C. Each of the curved depending parts 50 will be integral with the support 33 formed in the corresponding member C and will be provided at its lower end with a rib 51 corresponding with the rib 34 on such support 33. The blocks G of refractory material in those portions of the members C opposite the depending parts 50 will be molded to proper shape to engage the lower ends of such parts 50, as indicated in Figures 3 and 5 of the drawings, and these blocks G will also be molded with semi-cylindrical openings through which the cast metal may pass from the pouring gates to the interior of the casting chamber.

In the accompanying drawings, my improved casting mold is shown as of a shape specifically adapted for the casting of brake shoes for railway cars, although obviously the invention is equally applicable for the casting of any other articles.

One object in forming the molding receptacle of a plurality of blocks or sections is to avoid the danger of the breakage of this receptacle or of the flask or holder therefor incident to the expansion when the cast metal is poured therein. This object I have accomplished by forming the molding receptacle of such number of refractory blocks that the spaces between the blocks, while not large enough to permit the passage of molten metal therethrough, will nevertheless take care of the expansion of the blocks and so avoid the danger of breakage incident to such expansion. I am aware that materials when subjected to high temperatures have a definite co-efficient of expansion, say 1/8th of an inch per lineal foot; hence if the molding receptacle were made in one piece and one foot long, the longitudinal expansion of the receptacle would amount to approximately 1/8th of an inch during the operation of casting.

I am also aware that molten metal by reason of its viscosity will not flow through a small opening, say less than 1/64th of an inch wide. I would in such a case employ the blocks in such number that the width of the individual spaces between the blocks would not exceed 1/64th of an inch and the spaces would be in sufficient number to aggregate at least 1/8th of an inch and so take care of the maximum expansion of the blocks, to thereby maintain a constant overall length or dimension of the molding receptacle during high temperature casting therein, such as required for molten iron for railway brake shoes. While the spaces between the blocks are not of sufficient width to permit the passage of molten metal therethrough, they nevertheless effectively serve for the venting of the gases from the molten metal during the casting operation. This eliminates the necessity for a riser or venting gate. It will be understood that when the blocks are set in position upon their respective supports, they will be held properly spaced apart by the several key or guard plates hereinbefore described.

A further advantage incident to forming the molding receptacle of a plurality of sections of blocks of refractory material is that the individual sections or parts of the receptacle can be readily replaced when required. By permitting a free circulation of air about the outer wall of the molding receptacle, the heat rapidly radiates therefrom. This is a very advantageous feature.

The brake shoe W shown as in the casting chamber in Figure 3 of the drawings is of a familiar type, being formed with the usual center lug *w* and end lugs *w'*, the center lug *w* having an opening that will be formed by a core supported in pockets X. It will be understood, of course, that the inner faces of the blocks of refractory material will be properly shaped to form such parts as the center lug *w* and end lugs *w'*; and where it is desired to form a brake shoe having certain areas chilled, cast iron blocks would preferably be used at such points of the molding receptacle, instead of the blocks of refractory material.

From the foregoing description, it will be seen that when the casting mold has its several parts in closed position as shown, the cast metal will be delivered through the pouring gate into the casting chamber, the gases from the molten metal being vented through the spaces between the blocks of refractory material that compose the molding receptacle. It is highly desirable that the casting should be quickly removed from the mold as soon as it is sufficiently set and my improved construction of mold enables the mold members to be freely turned away from the casting without scraping or sliding against the casting.

It will be noted from the description of the mold as herein given, that there is a limited area of contact between the blocks constituting the molding receptacle, and the walls of the supporting members. Also, the contact, from a heat transfer standpoint, is a poor one, due to the looseness or relative play between the parts. In this manner the heat of the blocks is only imperfectly conducted to the metal flask members whereby the flask members are not subjected to high temperature conditions as compared to the blocks. This feature, in combination with the openings providing for air circulation enables the flask members to be continuously kept cool enough to substantially entirely prevent variations in length thereof by reason of expansion. Since the sectionalizing of the molding receptacle enables it to maintain a constant overall length, and since the flask may be maintained cool enough so that its expansion is negligible, the production of accurate castings is made possible, and the efficient cooperation of the various movable mold or flask members is insured at all times.

While I have found it advantageous to form my blocks of carborundum or other highly refractory material, I am aware that metal or any other suitable substance can be used and I do not wish to be limited to any particular material or group of materials.

I claim:

1. An openable casting mold having a molding receptacle comprising a plurality of blocks, at least some of said blocks being of non-metallic refractory material, said blocks being spaced apart to permit the expansion of the blocks, the spaces between the blocks being of such width as to prevent the passage of molten metal therethrough while allowing for the escape of gases from said metal, and insuring the maintenance of a constant overall length of the molding receptacle, and metallic supporting means to which said blocks are detachably secured.

2. A casting mold having a molding receptacle comprising a plurality of blocks of refractory material, said blocks being spaced apart sufficiently to permit the expansion of the blocks and the escape of the gases from the metal but the spaces being of such width as to prevent the passage of the molten metal therethrough, the number of blocks and spaces corresponding substantially to the extent or expansion of the material composing the blocks under high temperature molding conditions and metallic supporting means to which said blocks are detachably secured.

3. A casting mold having a molding receptacle comprising a plurality of loosely assembled blocks, at least some of said blocks being of non-metallic refractory material, separable flask sections wherein said blocks are removably supported, the block supports of said flask sections being protected by said blocks against contact with the molten metal.

4. A casting mold having a plurality of chambered flask members provided for the circulation of a cooling fluid therethrough and with supports for a molding receptacle, and a plurality of blocks forming said molding receptacle, said blocks being shaped to form a casting chamber and arranged at slight distances apart thereby permitting gases to escape between said blocks and through the chambered flask sections and permitting the expansion of the blocks, while maintaining the desired receptacle dimensions.

5. A casting mold comprising separable metal flask members provided with inwardly extending supports, and a molding receptacle formed of spaced blocks permitting venting therebetween, at least some of which are of non-metallic refractory material shaped to interlock with said supports and protect them from contact with the molten metal.

6. A casting mold comprising separable metal flask members having a molding receptacle formed of a plurality of individually movable sections detachably connected thereto, at least some of said sections being of non-metallic refractory material.

7. A casting mold comprising a plurality of separable metal flask members each provided with a mold section formed of a plurality of separate individually expansible blocks detachably connected to said member, at least some of said blocks being of non-metallic refractory material said blocks forming, when said members are brought together, a casting chamber.

8. A casting mold comprising a metallic body formed of a plurality of separable members, each of said members being chambered and constructed for the circulation of a cooling fluid therethrough, and provided with inwardly projecting supporting means, said members having mounted upon their supporting means a plurality of blocks adapted, when the members are brought together, to form a molding receptacle spaced from the metal walls of the body.

9. A casting mold comprising a plurality of hollow members having fluid circulation openings and provided with inwardly projecting supporting means, and a molding receptacle formed of a plurality of spaced blocks of refractory material mounted upon said supporting means in such manner as to leave free space beteween the outer faces of said blocks and the corresponding walls of the members for the circulation of air.

10. In a casting mold, a metal member provided with an inwardly projecting support, a plurality of spaced blocks mounted upon said support to form part of a molding receptacle, and detachable means for holding said blocks removably in place thereon, the spaces between said blocks aggregating enough to maintain a constant overall length of the molding receptacle during the casting of iron therein.

11. In a casting mold, a hollow member provided with an inwardly projecting rib, a molding receptacle section comprising a plurality of spaced blocks of refractory material mounted upon said rib, and a key plate detachably connected to said hollow member and engaging said blocks to retain them in position thereon, the spaces between said blocks aggregating enough to maintain a constant overall length of the molding receptacle during the casting of iron therein.

12. A casting mold comprising a base member, end members, and a plurality of sides pivotally supported on said base member, each of said sides comprising a plurality of members hinged together and having a molding receptacle section of refractory material detachably connected thereto.

13. A casting mold comprising a base, side members, and end members pivotally supported on said base, said members being provided with inwardly projecting supports for a molding receptacle, said receptacle being formed of a plurality of blocks mounted upon said supports.

14. A casting mold comprising a base, sides and ends pivotally mounted upon said base, each of said sides comprising a plurality of sections hinged together.

15. A casting mold comprising hinged side members and hinged end members, each of said members being formed with an inwardly projecting supporting bar and being provided with a removable key or guard plate detachably connected to said member, and a molding receptacle formed of sections spaced to maintain a constant receptacle dimension during high temperature casting therein and detachably mounted upon the supporting bars of said members and held in place by said keys or guard plates.

16. A casting mold comprising movable side and end members, a stationary member between said side members, and a molding receptacle formed of sections, certain of said sections being carried by the stationary member, and others of said sections by said side and said end members.

17. In a casting mold, an openable molding receptacle comprising a plurality of blocks detachably mounted therein and secured thereto forming a casting chamber, certain of said blocks being spaced apart to permit the expansion of the blocks during a high temperature casting operation without destroying the mold dimensions.

18. In a casting mold for repetition high temperature casting, an openable molding receptacle comprising a plurality of blocks forming a complete casting chamber, certain of said blocks being spaced apart to permit normal expansion of the blocks under the high temperature conditions to which they are subjected, the spaces between said blocks being of such width as to prevent the passage of molten metal therethrough while allowing for the escape of gases from said metal.

19. A casting mold comprising a plurality of relatively openable flask members each provided with a mold section formed of a plurality of separate blocks adapted when the flask members are in assembled relation to form a substantially closed casting chamber, certain of said blocks in each section being spaced apart sufficiently to permit the expansion of the blocks in the section under high temperature casting without destroying the mold dimensions.

20. In a casting mold, a molding receptacle of refractory material having at least all of its major walls provided with venting openings, said openings being of such width as to prevent the passage of the molten metal therethrough.

21. In a casting mold, a molding receptacle having its walls provided with a plurality of venting slots, said slots being of such width as to prevent the passage of the molten metal therethrough but permitting free expansion and the escape of the gases, and a cooled supporting means for the receptacle.

22. In a casting mold, a repetition molding receptacle for high temperature casting having at least all of its major walls slotted to permit expansion thereof and the escape of the gases, the slots in said walls being of such width as to prevent the passage of the molten metal therethrough.

23. A casting mold comprising a frame, and a substantially closed molding receptacle supported therein, said receptacle being formed of a plurality of normally spaced blocks of refractory material, said frame being constructed to support said blocks in normally spaced relation.

24. A casting mold comprising a flask, and a molding receptacle supported therein, said receptacle being formed of a plurality of relatively movable blocks of refractory material protecting the entire flask from contact with the molten metal.

25. A casting mold comprising a flask, and a separable molding receptacle supported within said flask with its walls spaced from the corresponding walls of the flask to form a circulating air chamber therebetween, the walls of said flask being provided with one or more openings to permit the circulation of air into and from said chamber.

26. A casting mold comprising a frame, and a molding receptacle supported therein, said receptacle being formed of a plurality of normally spaced blocks of refractory material, said frame being constructed to support said blocks in normally spaced relation.

27. A casting mold comprising a metal flask, and a molding receptacle of normally spaced sections supported within said flask and separable therefrom with its walls spaced from the corresponding walls of the flask to form an air-chamber therebetween, the walls of said flask being provided with openings to permit the circulation of air into and from said chamber.

28. A casting mold comprising a metallic body formed of a plurality of separable members, each of said members being chambered and provided with inwardly projecting supporting means, said members having upon their supporting means a plurality of normally spaced blocks adapted, when the members are brought together. to form a molding receptacle spaced from the metal walls, and openings in said walls to permit the circulation of air into and from the chambers in said members.

29. A casting mold comprising a metallic body formed of a plurality of separable members, each of said members being chambered and provided with inwardly projecting supporting means, said members having upon their supporting means a plurality of blocks of repetition molding material adapted, when the members are brought together, to form a molding receptacle spaced from the metal walls, openings in said walls to permit the circulation of air into and from the chambers in said members, there being vent openings between said blocks permitting expansion of the blocks while maintaining constant molding receptacle dimensions.

30. In a casting mold, the combination with a flask, of a molding receptacle therein having at least its major walls provided with a plurality of slots extending therethrough to permit the expansion of the walls while maintaining constant molding receptacle dimensions, and to permit the venting of the gases from the receptacle, said flask being provided with venting openings.

31. In a casting mold, the combination with a flask, of a repetition molding receptacle of refractory material supported within said flask and having at least its major walls provided with a plurality of slots extending therethrough to permit the expansion thereof and the venting of the gases from said receptacle, said flash being constructed to engage and support refractory material to prevent displacement thereof.

32. In a mold, relatively movable mold members, a plurality of normally spaced block members carried by at least some of said mold members and forming a molding receptacle when the mold members are in closed position, said members being constructed to provide relatively poor heat transfer from the block members to the mold members, and said mold members being constructed to permit the circulation of a cooling fluid effective on the mold and block.

33. In a mold, relatively movable mold members, a plurality of normally spaced sections carried by at least some of said members and forming a molding receptacle when the members are in closed position, said members being constructed to permit the circulation of a cooling fluid effective for cooling both the sections and said members.

34. In a mold, relatively movable mold members, a plurality of normally spaced block members directly supported and carried by at least some of said mold members and forming a molding receptacle when the mold members are in closed position, said members being constructed to provide relatively poor heat transfer from the block members to the mold members.

35. In a repetition casting mold, a mold support, a plurality of normally spaced blocks carried by said support and adapted to cooperate to form a molding receptacle, and a flanged supporting contact between said blocks and said support.

36. In a repetition casting mold, a mold support, a plurality of normally spaced blocks carried by said support and adapted to cooperate to form a molding receptacle, and a flanged supporting contact between said blocks and said support, said support being provided with openings for the circulation of a cooling fluid for both the blocks and the support.

37. In a repetition casting mold, a mold support, a plurality of normally spaced blocks carried by said support and adapted to cooperate to form a molding receptacle, and a flanged supporting contact between said blocks and said support, said support being chambered to provide for the circulation of air therethrough for cooling the same.

38. In a repetition casting mold, a mold support, a plurality of normally spaced blocks directly supported and carried by said support and adapted to cooperate to form a mold receptacle, the spacing between said blocks aggregating enough to compensate for changes in block dimensions due to the expansion under high temperature casting conditions, there being a poor heat transfer contact between said blocks and the support.

In testimony whereof I have hereunto set my hand.

CLIFTON D. PETTIS.